Oct. 16, 1928.
A. R. OBERWEGNER
CASTER LOCK
Filed May 28, 1927
1,687,631
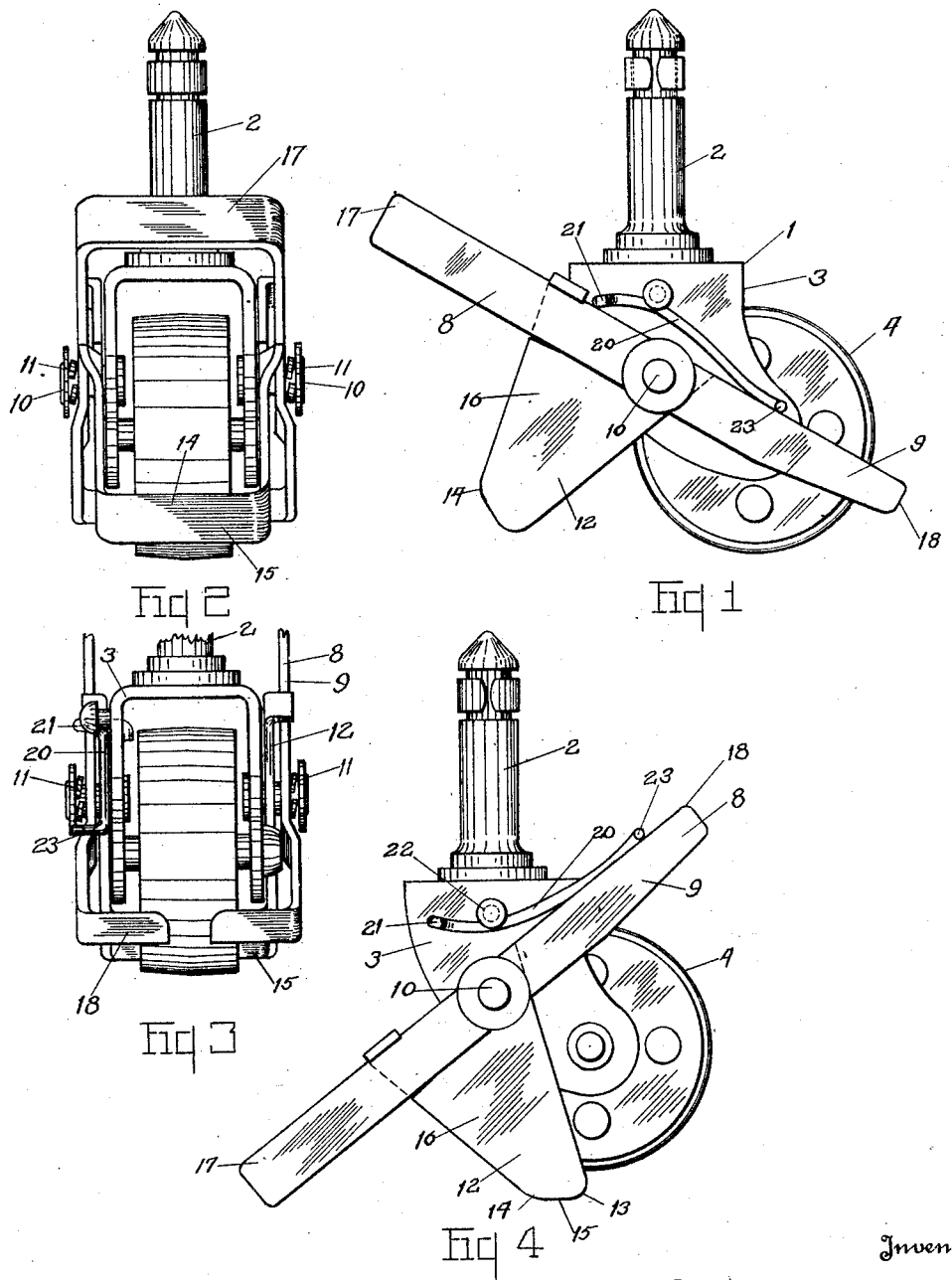
Inventor
Alfred R. Oberwegner.
By Faust F. Crampton
Attorney Patented Oct. 16, 1928.

1,687,631

UNITED STATES PATENT OFFICE.

ALFRED R. OBERWEGNER, OF TOLEDO, OHIO.

CASTER LOCK.

Application filed May 28, 1927. Serial No. 194,882.

My invention has for its object to provide a lock for casters that can be readily and conveniently operated to lock and unlock casters used for shiftably supporting any form of device or construction. Constructions containing my invention may be manipulated merely by pressure of the foot to lock and unlock the casters and obviates the necessity of manipulating any part by hand to perform the same operations.

The invention may be contained in caster constructions of different forms, and to illustrate a practical application of my invention, I have selected a caster lock containing the invention as an example of the different forms of device that embody my invention and I shall describe hereinafter the caster lock selected. The particular caster lock referred to is shown in the accompanying drawing.

Fig. 1 is a side view of the caster selected for purposes of illustration. Fig. 2 is one edge view of the caster shown in Fig. 1. Fig. 3 is a broken view showing parts of the lock shown in Fig. 1. Fig. 4 is a similar view to that shown in Fig. 1, the lock being shown in its locked position while in Fig. 1 it is shown as being located in the unlocked position.

In order that the lock may be readily operated by the pressure of the foot to secure the article, such as a piece of furniture or washing machine or other device, in the position to which it may be moved, the lock embodying my invention is so constructed that a member is moved to a point intermediate the caster roller or wheel and the floor or supporting surface on which the device rests, and in order that the device may at all times be positioned so that the caster may be locked notwithstanding the free movement of the caster about its vertical axis, the locking means is preferably supported on the caster frame or yoke and, hence, is supported in fixed relation with respect to the roller. As shown in the drawing, the caster 1 is provided with the usual spindle 2 that is commonly inserted in a supporting leg of an article of furniture or of machinery or other device, and a yoke 3 is connected to the lower end of the spindle 2. The caster wheel, or roller, 4 is pivotally supported in the lower end of the yoke and at a point located a material distance to one side of the vertical axis of the spindle 2 in the manner well known in the art. The locking device embodying my invention is pivotally supported preferably substantially in the plane of the axis of the spindle. It is thus pivotally connected to the yoke 3 so that it may be rotated about an axis located at right angles to the axis of rotation of the caster spindle and so that the portion of the weight that is supported by the caster frame may be transferred from the caster wheel to the locking device.

The locking device 8 embodying my invention is preferably formed of a bar 9 bent in the form of a rectangle and so as to surround the yoke 3 and the roller 4. It is pivotally connected to the yoke 3 by the pivot pins 10 that extend through the sides of the lock 8 and the sides of the yoke 3. Lock washers of the type commonly known as split washers having projecting end portions, such as the washers 11, are located intermediate the heads of the pins 10 and the bar 9, or the sides of the lock 8, to frictionally hold or retain the lock 8 in the position to which it may be turned about the pivot pins 10. A U-member 12 is secured to the sides of the rectangle formed by the bar 9 and so as to project downwardly towards the floor or other surface on which the caster is supported. The lower side of the U-member is preferably rounded as at 13 and 14, forming a substantially rounded surface 15 intermediate the portions 13 and 14 and which extends between the legs 16 of the U-member 12. The legs 16 of the U-member have a length sufficient to locate the lower end of the U-member which interconnects the legs 16 at a point from the pivot pins 10 that is slightly greater than the lower point of the roller is from the pivot pins 10 and so that when the lock 8 is turned in one direction the lower end of the U-member 12 will first be brought into contact with the floor and will slip under the roller and come to rest on the rounded portion 15. When in this position the rounded portion 15 is located on one side of the axis of the spindle 2 of the caster and the end 17 of the rectangle formed bar 9 is located on the opposite side and so that the line of pressure due to the weight of the article or device supported will be between the lower end of the U-member 12 and the end 17 of the lock 8. Thus the caster and the article supported by the caster is slightly raised by the movement of the U-member beneath the caster wheel or roller and on continued movement in this direction, which is away from the vertical plane passing through the axis of rotation of the lock, the caster and the part which it supports are slightly lowered until the end 17 of the lock comes in contact with the floor. Thus the device or article will be supported by the lock 8, the line of direction of the pressure due to the weight of the article passing between the lines of contact formed by the transversely extending and rounded part 15 of the U-member 12 and the transversely extending part 17 of the lock 8. Thus the lock will be yieldingly held in position by the weight of the article or machine or other device.

The lock may be placed in this locked position by mere pressure of the foot on the end 17 of the lock, which will force the lower end of the U-member beneath the roller and the weight of the machine will cause the lock to readily snap or quickly move into position, that is, so as to press the end 17 of the lock on the floor and lock the transversely extending portions 15 and 17 of the lock on opposite sides of the axial line of the spindle 2.

In order to unlock the lock all that is necessary is to step on the end 18 of the rectangularly formed bar 9. This will cause the lower end of the U-member 12 to slightly raise the caster and the article supported by the caster and then to lower the roller to the floor. When the end 18 is stepped on, the end 17 is raised from the floor, which locates the point of contact of the roller with the floor between the lower end of the U-member 12 and the end 18. In order to prevent movement of the lock 8 about its axis of rotation to a point such that the end 18 will come into contact with the floor, a suitable stop may be located on the yoke 3 so as to locate the transversely extending portion 15 that forms the lower end of the U-member 12 and the transversely extending portion 18 that forms one end of the lock 8 above the floor. In the form of construction shown, a spring 20 is secured to one side of the yoke 3 and is provided with a protruding ear 21 that projects from the side of the yoke sufficiently to be located in the line of movement of one side of the lock 8. This part of the spring 20 is so located with reference to the pins 10, about which the lock rotates, that movement of the end 18 will be brought to a stop at a point such as to locate the transversely extending portion 15 of the U-member 12 and the transversely extending portion 18 of the lock 8 above the floor. The spring 20 operates intermediate a pin 22 that is engaged by one side of the spring and one of the sides of the lock 8 which is engaged by a protruding end 23 of the spring. The spring 20 operates to hold the lock in its unlocked position, that is, to hold the side of the lock 8 against the stop formed by the protruding portion 21 of the spring 20.

I claim:

1. In a caster lock, a frame pivotally connected to the yoke of the caster, the pivotal axis of the frame being located substantially horizontally and in the plane of the vertical axis of the caster, the frame having two projecting parts for engaging the surface on which the caster is located, means for locating the points of contact with the said surface on opposite sides of the vertical axis of the said caster.

2. In a caster lock, a frame pivotally connected to the yoke of the caster, the pivotal axis of the frame being located substantially horizontally and in the plane of the vertical axis of the caster, the frame having two projecting parts for engaging the surface on which the caster is located, a spring for normally holding the said parts away from the said surface, and means for locating the points of contact of the said parts of the frame on opposite sides of the vertical axis of the caster and at a point below the horizontal level of the lower point of the wheel of the caster.

In witness whereof I have hereunto signed my name to this specification.

ALFRED R. OBERWEGNER.